Aug. 19, 1969  H. J. SCHWERDHÖFER  3,461,746
CENTRIFUGAL COUPLING ARRANGEMENT
Filed Sept. 25, 1967  5 Sheets-Sheet 4
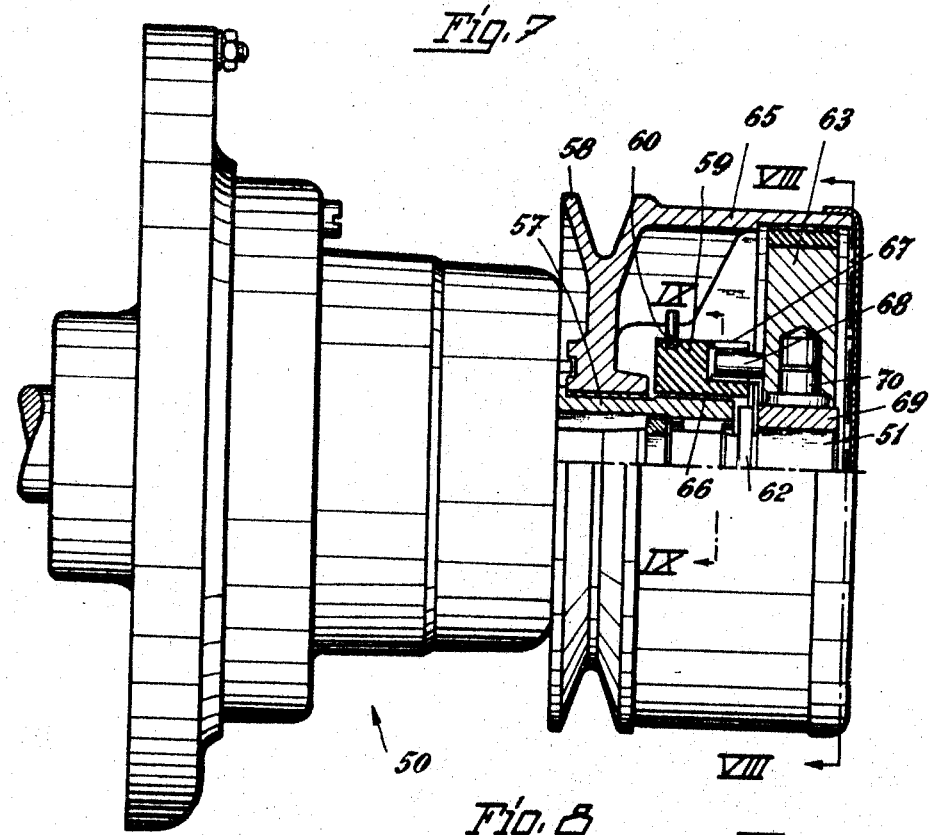
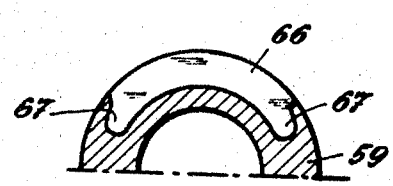
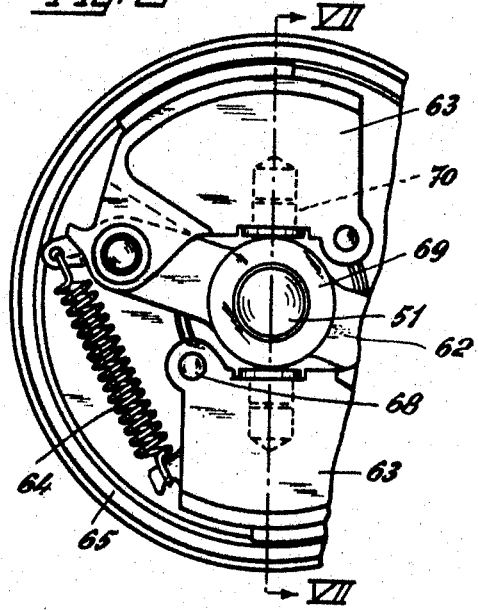

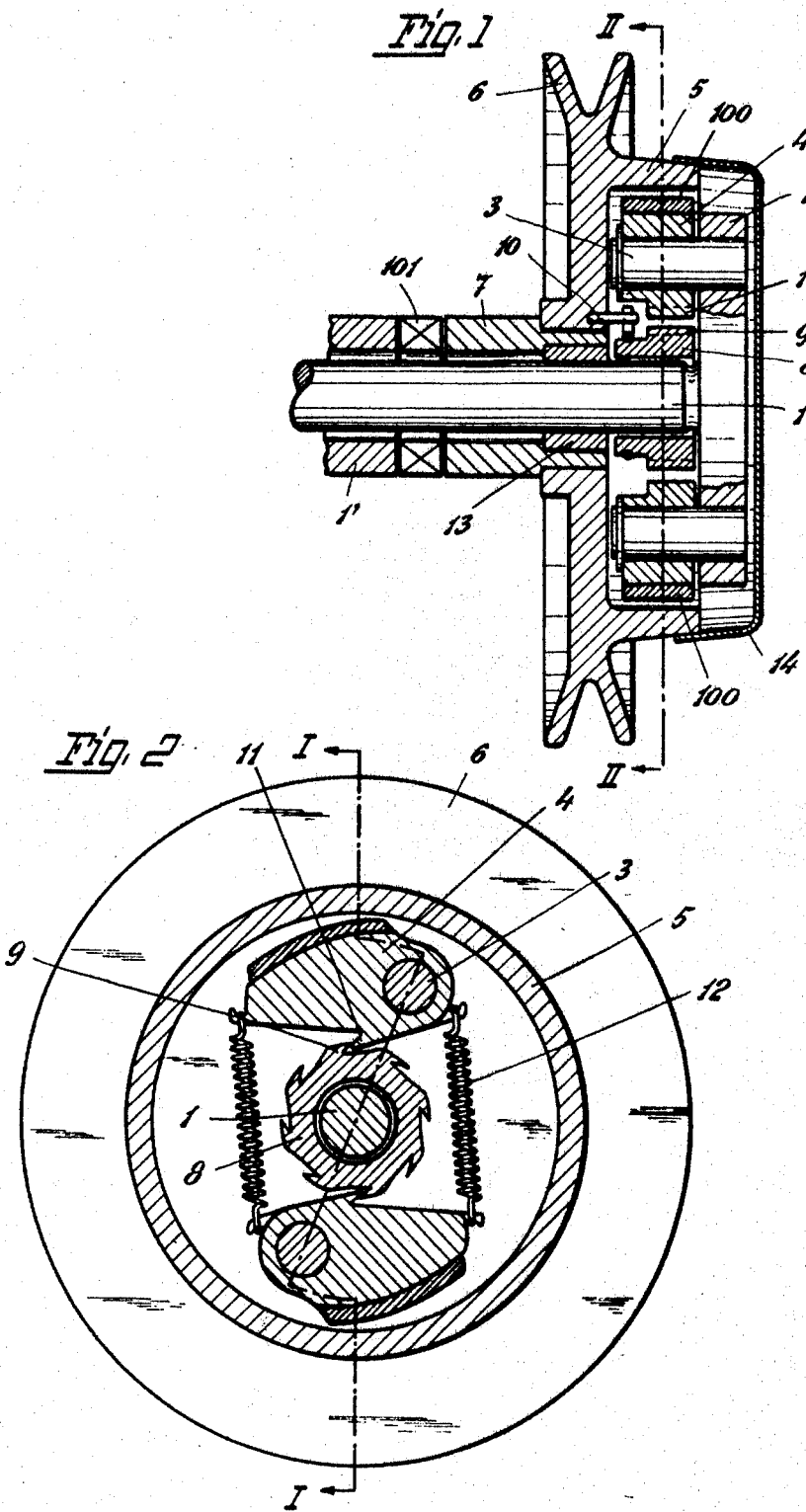

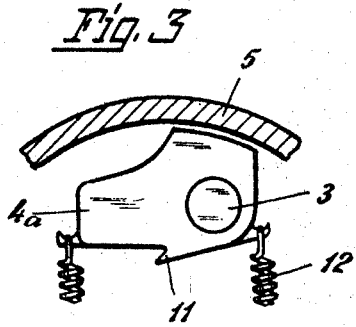
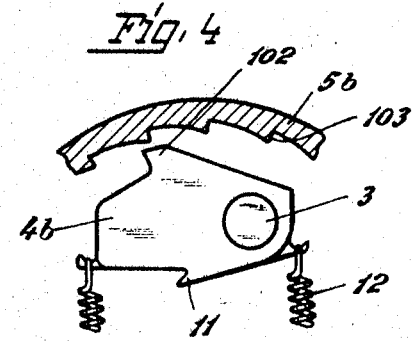
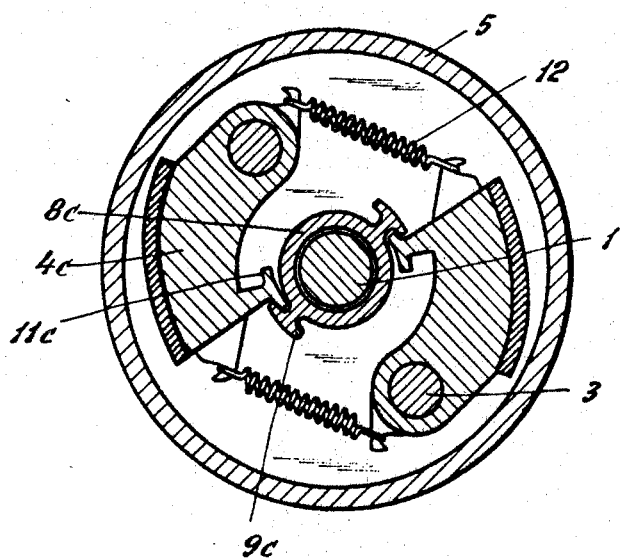

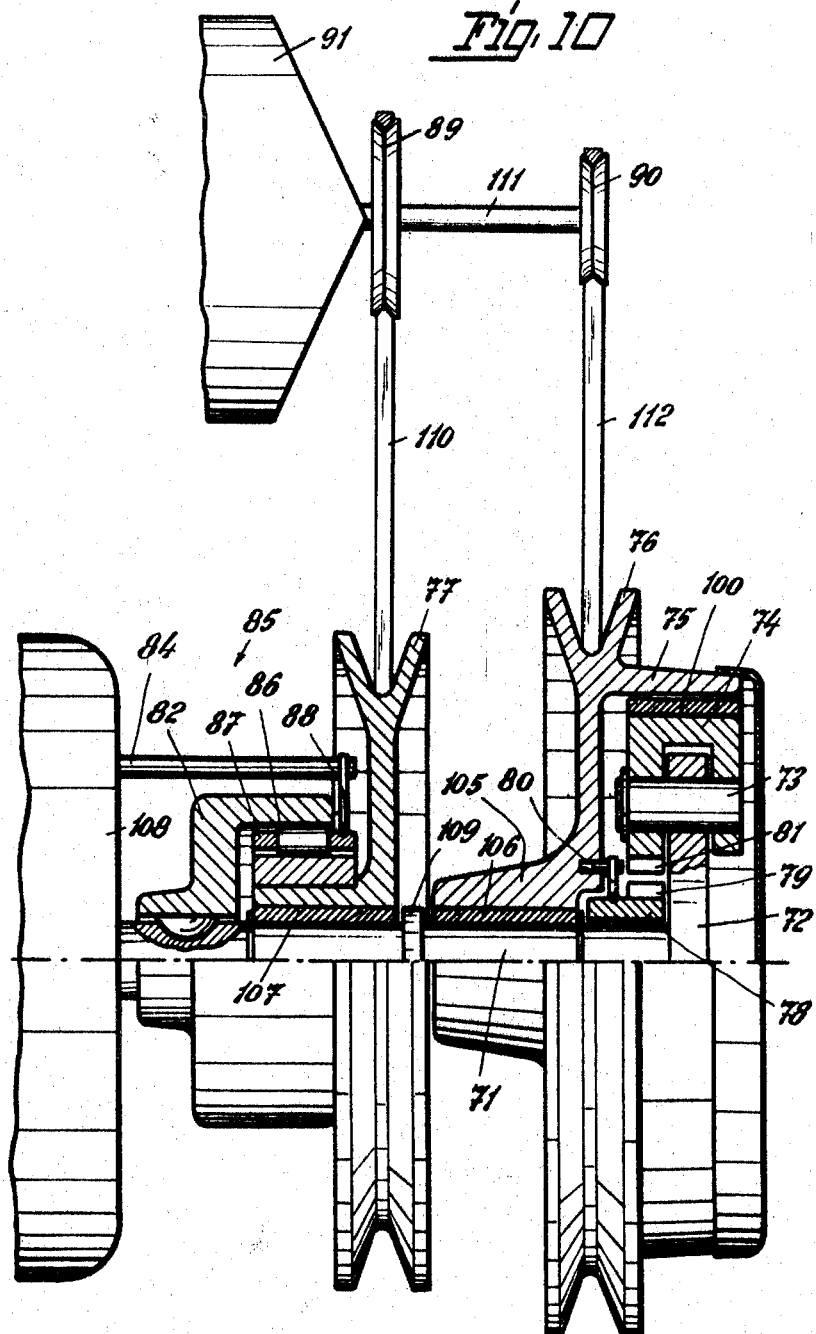

United States Patent Office 3,461,746
Patented Aug. 19, 1969

3,461,746
CENTRIFUGAL COUPLING ARRANGEMENT
Hans Joachim Schwerdhöfer, Schweinfurt, Germany, assignor to Fichtel & Sachs A.G., Schweinfurt, Germany
Filed Sept. 25, 1967, Ser. No. 670,305
Claims priority, application Germany, Oct. 7, 1966,
F 50,381
Int. Cl. F16h *3/74;* F16d *23/10, 43/06*
U.S. Cl. 74—752
10 Claims

ABSTRACT OF THE DISCLOSURE

A coupling arrangement having two coaxial input shafts driven at different speeds, an output pulley permanently connected to the slower shaft by an overriding clutch, and centrifugal weights on the faster shaft which drivingly engage a coupling face on the pulley when centrifugally shifted radially outward against biasing springs. A rotatable control ring frictionally coupled to the slower shaft has teeth engageable by matching teeth on the weights to lock the latter in the inoperative position during incipient movement of the shafts, and for release at full speed when the drive is briefly deenergized.

BACKGROUND OF THE INVENTION

This invention relates to centrifugal couplings, and particularly to an arrangement which couples an output member to a driven input member upon a signal if the speed of the input member has reached a certain minimum value.

More specifically, the invention is concerned with an arrangement in which an output member is normally driven by the slower one of two drive shafts, and may be coupled to the faster drive shaft after the rotary speed of the latter reaches a predetermined value, but in which the output member is driven by the slower drive shaft regardless of the rotary speed of the faster shaft until a speed changing signal is provided.

Dual or multiple-speed drives including coupling arrangements of the described type may be used to advantage in washing machines having a drum which turns for washing at low speed and for extraction at high speed, and the invention will be described with reference to a washing machine drive hereinafter, but other applications will readily suggest themselves to those skilled in the art.

An important object of the invention is the provision of a centrifugal coupling arrangement of the type described which is simple and rugged in its construction, and which can be controlled in a simple manner.

SUMMARY OF THE INVENTION

The carrier for a centrifugal weight is rotated about an axis in the coupling arrangement of the invention by a drive motor. The weight is urged by centrifugal force to move on the carrier from an inoperative to an operative position, but is resiliently biased toward the inoperative position. Coupling elements on the centrifugal weight and on a coaxially rotatable output member couple the drive motor to the output member in the operative position of the centrifugal weight.

The invention provides this basically conventional arrangement with a control member and with locking elements on the control member and on the centrifugal weight. When the carrier of the weight rotates faster than the output member, an engaging device engages the locking elements on the control member and on the centrifugal weight in the inoperative position of the latter to lock the centrifugal weight in the inoperative position.

Other features, additional objects, and many of the attendant advantages of this invention will readily be appreciated when the same becomes better understood by reference to the following detailed description of preferred embodiments when considered in connection with the appended drawing.

BRIEF DESCRIPTION OF THE DRAWING

In the drawing:
FIG. 1 shows a coupling arrangement of the invention in side-elevational axial section on the line I—I in FIG. 2;
FIG. 2 shows the apparatus of FIG. 1 in radial section on the line II—II;
FIGS. 3 and 4 show modified details for the apparatus of FIG. 2;
FIG. 5 shows another modification of the coupling arrangement in a view corresponding to that of FIG. 2;
FIG. 7 shows a modification of the device of FIG. 6 partly in side-elevation and partly in section on the line VII—VII in FIG. 8;
FIG. 8 illustrates the apparatus of FIG. 7 in an end view as indicated by the line VIII—VIII, but without its cover;
FIG. 9 illustrates a detail of the apparatus of FIG. 7 in fragmentary radial section on the line IX—IX;
and
FIG. 10 shows yet another coupling arrangement of the invention in side elevation, partly in section.

Figure 6:
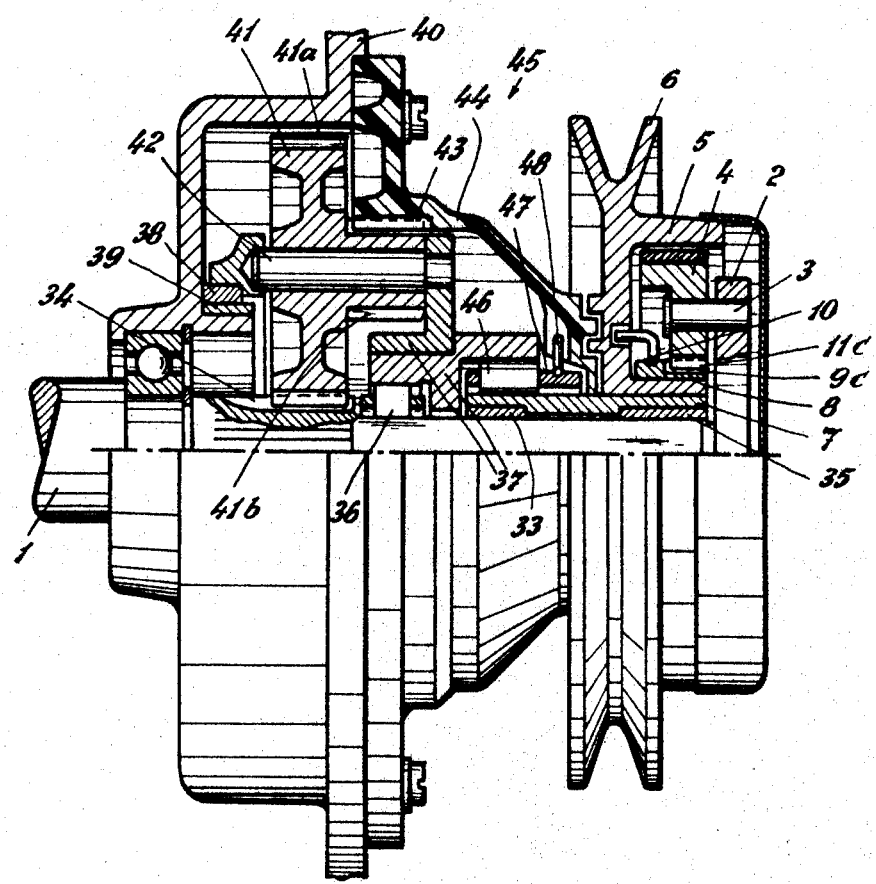
FIG. 6 shows a coupling arrangement substantially identical with that illustrated in FIGS. 1 and 2 and an associated drive mechanism partly in side elevation, and partly in axial section.

DESCRIPTION OF THE PREFERRED
EMBODIMENTS

Referring initially to FIGS. 1 and 2, there are shown two drive shafts 1, 1' of a two-speed drive, the high-speed shaft 1 being coaxially received in the low-speed shaft 1'. A disc 2 mounted on the free end of the shaft 1 carries two diametrically opposite pins 3 on which arms 4 are pivoted in such a manner that centrifugal force tends to swing friction facings 100 on the arms into coupling engagement with the inner face of a cylindrical flange 5 on a V-belt pulley 6. The arms 4 are biased toward the illustrated inoperative position by helical springs 12 attached to hooks at the two ends of the arms 4.

The pulley is fixedly fastened to a short tubular shaft 7 rotatably mounted by means of a bearing bushing 13 on the high-speed shaft 1 and axially connected to the low-speed drive shaft 1' by an overriding clutch 101, conventional in itself and not shown in detail, which permits the pulley 6 to rotate at a speed higher than that of the shaft 1'.

A control wheel 8 is axially secured between the bushing 13 and the disc 2, but rotates freely on the shaft 1. It has eight equiangularly arranged peripheral teeth 9 which define recesses that are open in one circumferential direction, but closed in the other circumferential direction and in both radial directions. Each arm 4 has a projecting tooth 11 shaped to be conformingly received in the recesses of the control wheel 8. The latter has a tubular hub which is enveloped by one end of a friction spring 10 in a circular arc. The other end of the spring is attached to the pulley 6. A cover 14 removably attached to the flange 5 normally protects the centrifugal mechanism.

The afore-described apparatus operates as follows:
When the common drive motor (not shown) starts rotating the shafts 1, 1', the control wheel 8 is rotated with the pulley 6 by the spring 10 at the lower speed of the shaft 1'. The arms 4 initially do not rotate fast enough to overcome the tension of the springs 12. The shaft 1, however, rotates faster in a counterclockwise direction, as viewed in FIG. 2, than the pulley 6 and the control wheel 8, and the teeth 11 on the arms 4 fully engage the recesses under the teeth 9 on the control wheel 8 which is braked by the spring 10. The wheel thereafter rotates at the speed of the shaft 1, and the spring 10 slides over the wheel hub.

As the speed of the shaft 1 increases, centrifugal forces sufficient to overcome the springs 12 tend to pivot the arms 4 clockwise (as viewed in FIG. 2) on the pins 3, but the arms are locked in the inoperative position near the shaft 1 by the engaged teeth 9, 11 as long as the speed of the shaft 1 is not smaller than that of the pulley 6. The friction facings 100 are spaced from the coupling face of the flange 5, and the pulley 6 is driven by the low-speed shaft 1' regardless of the speed of the shaft 1.

If it is desired to switch the pulley 6 to the higher speed, the nonillustrated drive motor is briefly deenergized, whereby the rotary speed of the shafts 1, 1' is reduced. The pulley 6 has substantial inertia which may be further increased by a connected rotary load, and its speed drops more slowly than that of the shaft 1. The spring 10 drives the wheel 8, and the teeth 9 of the wheel move counterclockwise relative to the locking teeth 11 of the arms 4 until the arms are free to follow the centrifugal force. When the driving motor is again energized, the pulley 6 is driven by the shaft 1 by means of the engaged friction facings 100. The shaft 7 overtravels the shaft 1'.

Centrifugal weights other than the arms 4 may be employed, but weights which swing on a carrier in response to centrifugal forces are preferred. Modified arms are illustrated in FIGS. 3 to 5. The arm 4a shown in FIG. 3 is closely similar to the afore-described arm 4, but lacks separate friction facing. It makes direct frictional contact with the pulley flange 5 in the operative position of the centrifugal weight.

In the modified device partly shown in FIG. 4, the arm 4b, instead of a friction facing, carries an integral pawl 102 which engages ratchet teeth 103 on the coupling face of the pulley flange 5b in the operative position of the weight 4b.

FIG. 5 shows a modification of the apparatus of FIGS. 1 and 2 suitable for use with a reversing drive. The control member 8c which replaces the wheel 8 is a sleeve freely rotatable on the high-speed shaft 1 and provided with two diametrically opposite projections 9c of approximately T-shaped cross section, each projection defining two recesses open in respective circumferential direction, but closed in the other circumferential direction and in both radial directions. Similarly shaped projections 11c are provided on the two centrifugal weights 4c.

The projections 11c engage the recesses under the projections 9c during low-speed operation in the illustrated manner when the shaft 1 is rotated counterclockwise. When the rotation of the shaft 1 is clockwise, the arms 4c are held in the inoperative position by engagement of the arms on the projections 11c which are free in FIG. 5 with the recesses under the projections 9c which are open in a counterclockwise direction.

The coupling arrangements shown in FIGS. 3 to 5 are identical with the mechanism shown in FIGS. 1 and 2 in all non-illustrated aspects.

FIG. 6 shows a coupling arrangement practically identical with that illustrated in FIG. 5 in its cooperation with a two-speed transmission. The elements 1 to 11 shown in FIG. 6 correspond to the elements of the aforedescribed mechanism carrying the same reference numerals and will not be described again.

The shaft 1 is the output shaft of an electric motor, not otherwise shown. Teeth 34 cut into the shaft constitute the sun gear of a planetary gearing. Bearing bushings 33, 35 on the shaft 1 coaxially support the tubular shaft 7 which is the low-speed output shaft of the gearing. The planet carrier assembly 37 of the gearing is rotatably mounted on the shaft 1 by means of a bearing 36, and is additionally supported on bearing rings 38, 39 on a casing 40 which is either attached to the electric motor in a manner not illustrated, or otherwise held stationary.

The planet carrier assembly includes three shafts 42 which carry respective planet gears 41, only one gear 41 being seen in the drawing. The gears 41 have two gear rims each, the larger rim 41a meshing with the sun gear 34, and the coaxial smaller gear rim 41b meshing with a ring gear 43 which is an integral part of a stationary plastic portion 44 of the casing 40.

The planet carrier assembly 37 is coupled to the shaft 7 by a double-acting overriding clutch 45 of a known type disclosed in more detail in Patent No. 3,194,369. The clutch has clamping rolls 46 arranged in a cage 47 which is linked to the stationary casing portion 44 by a friction spring 48. The rotary speed of the planet carrier assembly 37 is 1/17 of the speed of the shaft 1 in the apparatus of FIG. 6. If the nonillustrated electric motor rotates the shaft 1 at 850 r.p.m., the drum of a washing machine connectde to the pulley 6 by a belt, not shown in FIG. 6, is driven at the higher speed during extraction of water from a washed load, but is driven at an output speed of only 50 r.p.m. by the illustrated coupling arrangement during the preceding washing operation.

If a dual-speed electromotor, such as a pole change motor, is employed, the pulley 6 is capable of more than two output speeds. The springs 12 and the centrifugal weights are preferably selected in such a manner that the weights are capable of being shifted to the operative position at the lowest nominal speed of the driving motor. Such an arrangement permits a washing machine to be operated at several washing and extraction speeds.

The coupling arrangement shown in FIGS. 7 to 9 has a transmission 50 including a planetary gearing and a double acting overriding clutch identical with the corresponding elements illustrated in FIG. 6. The motor shaft 51 coxially carries the low-speed output shaft 57 of the transmission 50 on which the V-belt pulley 58 is mounted as the output member of the coupling arrangement. The control member 59 of the coupling arrangement is a heavy ring which is linked to the pulley 58 by a friction spring 60 as described above.

The free end of the shaft 51 carries a fixedly attached centrifugal weight carrier 62 on which two arms 63 are pivotally mounted, and are biased toward their inoperaposition near the shaft 1 by two helical tension springs 64. When in their operative position, the arms 63 engage an internal, cylindrical coupling face on a drum 65 integral and coaxial with the pulley 58.

A portion of the control ring 59 is illustrated in FIG. 9. The ring has two diametrically opposite, circumferentially elongated, arcuate recesses 66 each of which is open in one axial and a radially outward direction and circumferentially terminates in two pockets 67 open toward the recess and in the above axial direction, but otherwise closed. Axial pins 68 projecting from the free ends of the centrifugal weights 63 engage pockets 67 while the weights are being held in the inoperative position by the control ring 59, each pin engaging a corresponding recess 66 under the urging of the tension springs 64, and being received in one or the other of the pockets 67 depending on the direction of rotation of the shaft 51. The apparatus otherwise functions as described above with reference to FIGS. 1 and 2.

When the nonillustrated motor is shut off at the end of a washing cycle while the pulley 58 rotates at extraction speed, the weights 63 are returned to the inoperative position by the springs 64. Resilient plugs 70, partly projecting from the arms 63 toward the shaft 1, abuttingly engage a ring 69 on the shaft to damp the impact of the arms.

A coupling arrangement of the invention which does not rely on planetary gearing for its slow speed drive is illustrated in FIG. 10.

The output shaft 71 of the electric motor 108 has a free end attached to a disc-shaped carrier 72 which supports two centrifugal weights 74 which are arms of U-shaped cross section, the two parallel ends of the U-shape receiving the peripheral portion of the carrier 72 therebetween, and being pivotally attached by pins 73 passing through the free ends and the disc. Friction facings 100 on the arms 74 engage an internal cylindrical coupling face on a flange 75 of a V-belt pulley 76 in the operative position of the arms 74. A hub portion 105 of the pulley is rotatably mounted on a bearing bushing 106 on the shaft 71.

A collar 109 axially spaces the pulley hub 105 from another pulley 77 rotatably mounted on the shaft 71 by means of a bearing bushing 107 nearer the motor 108. A control ring 78 is interposed axially between the hub 105 and the carrier 72 and freely rotatable on the shaft 71. A friction spring 80 connects the ring 78 with the pulley 76. Teeth 81 on the arms 74 and teeth 79 on the control ring 78 are shaped for locking engagement in the inoperative position of the arms 74 when the arms 74 rotate with the shaft 71 at a speed higher than that of the pulley 76 which is transmitted to the ring 78 by the spring 80.

A cup-shaped driver 82 fixedly fastened on the shaft 71 provides the outer race for the clamping rolls 86 of a double-acting overriding clutch 85 whose cage 87 is connected to the stationary housing of the motor 108 by a friction spring 88 and a rod 84. The inner race of the clutch is fixedly fastened to the hub of the pulley 77 which is smaller in diameter than the pulley 76.

The drive shaft 111 on the drum 91 of a washing machine, not otherwise shown, carries a bigger pulley 89 and a smaller pulley 90. Belts 110, 112 respectively connect the pulleys 77, 89 and 76, 90. Because of the dimensional relationships of the four pulleys, the shaft 111 is driven at a reduced speed by the motor 108 as long as the arms 74 are in the inoperative position, and the pulley 76 is driven at an even slower speed by the belt 112. When the arms 74 are released by the control ring 78 after the shaft 71 has reached full speed, and the motor 108 has been briefly deenergized, the shaft 111 is driven by the pulleys 76, 90 at a rotary speed higher than that of the shaft 71, and the even faster moving pulley 77 overtravels the cup-shaped member 82.

The motor 108 may be reversed, and the rotary speed of the washing machine drum 91 is selected by the ring 79 in either direction of motor rotation if the teeth 79, 81 are suitably shaped in a manner obvious from FIGS. 5 or 9. The weights 74 are locked in the inoperative position when the motor 108 starts turning the shaft 71, and remain locked even after the shaft 71 reaches the full design speed of the motor. The weights are released when the motor 108 is briefly deenergized either manually or by conventional contacts and relays in the timing mechanism of the washing machine, not itself relevant to this invention.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a centrifugal coupling arrangement having
   (i) a carrier member (2),
   (ii) drive means (1) for rotating said member about an axis,
   (iii) a centrifugal weight (4) mounted on said carrier member for rotation therewith and movable on said carrier member between an operative position and an inoperative position, said weight being urged by centrifugal force to move from said inoperative position to said operative position when said carrier member is being rotated about said axis,
   (iv) yieldably resilient means (12) biasing said weight toward said inoperative position,
   (v) an output member (6) rotatable about said axis, and
   (vi) coupling means (5,110) on said output member and on said centrifugal weight for coupling said output member to said centrifugal weight for joint rotation in the operative position of the latter, the improvement which comprises:
   (a) a control member (8);
   (b) locking means (9, 11) on said control member and on said centrifugal weight (4) engageable for locking said centrifugal weight in the inoperative position at a rotary speed of said carrier member (2) at which said centrifugal force is sufficient to overcome the biasing of said yieldably resilient means (12); and
   (c) engaging means (10) responsive to rotation of said carrier member (2) at a rotary speed higher than the rotary speed of said output member (6) for engaging said locking means when said centrifugal weight is in the inoperative position.

2. In an arrangement as set forth in claim 1, said control member being mounted for coaxial rotation relative to said carrier member and to said output member, said engaging means including connecting means yieldably connecting said control member to said output member, said control member and said weight constituting a pair of lockable elements, said locking means including a projection on one of said elements engageable with a locking recess in the other element, said projection being released from said recess when the rotary speed of said output member is higher than the rotary speed of said carrier.

3. In an arrangement as set forth in claim 2, said connecting means including an elongated spring member, one end of said spring member being fastened to said output member, the other end of the spring member frictionally engaging said control member.

4. In an arrangement as set forth in claim 2, said control member having a plurality of teeth angularly spaced about said axis, each tooth defining a recess open in one circumferential direction and closed in the other circumferential direction and in a radially outward direction, said projection being arranged on said weight for locking engagement with one of the recesses of the control member, said one recess constituting said locking recess.

5. In an arrangement as set forth in claim 2, said control member being formed with said locking recess and with another recess, the recesses being open in respective opposite circumferential directions, and closed in an outwardly radial direction, and said weight carrying said projection for engagement with either recess of the control member.

6. In an arrangement as set forth in claim 5, a T-shaped projection on said control member defining said recesses, said projection of the weight being T-shaped.

7. In an arrangement 11, said carrier member being disc shaped, and said weight being of U-shaped cross section, a peripheral portion of said carrier member being received between the free ends of said U-shape, and a pivot pin connecting said free ends to said peripheral portion.

8. In an arrangement as set forth in claim 1, said drive means being adapted to rotate said carrier member at a predetermined speed, slow-speed drive means for rotating said output member at a speed lower than said predetermined speed during the rotation of said carrier member, said slow-speed drive means including an overriding clutch.

9. In an arrangement as set forth in claim 8, said slow-speed drive means including a speed reducing transmission interposed between said first mentioned drive means and said overriding clutch.

10. In an arrangement as set forth in claim 8, said slow-speed drive means including a shaft, an inertial load connected to said shaft for rotation therewith, first motion transmitting means including said overriding clutch interposed between said first mentioned drive means and said shaft, and second motion transmitting means connecting said shaft to said output member.

References Cited

UNITED STATES PATENTS

| 3,019,874 | 2/1962 | Heckethorn | 192—48.3 |
| 3,142,202 | 7/1964 | Muhlbeyer | 192—104 X |
| 3,254,545 | 6/1966 | Witte et al. | 74—752 |
| 3,340,972 | 9/1967 | Burkland et al. | 192—43.1 |

ARTHUR McKEON, Primary Examiner

U.S. Cl. X.R.

192—103